US009366166B2

(12) United States Patent
Blakeman et al.

(10) Patent No.: US 9,366,166 B2
(45) Date of Patent: Jun. 14, 2016

(54) FILTER SUBSTRATE COMPRISING ZONE-COATED CATALYST WASHCOAT

(71) Applicant: Johnson Matthey Public Limited Company, London (GB)

(72) Inventors: Philip Gerald Blakeman, Shanghai (CN); David Robert Greenwell, Cambridge (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/260,405

(22) Filed: Apr. 24, 2014

(65) Prior Publication Data

US 2014/0322113 A1 Oct. 30, 2014

Related U.S. Application Data

(60) Provisional application No. 61/815,443, filed on Apr. 24, 2013.

(30) Foreign Application Priority Data

Apr. 24, 2013 (GB) .................................. 1307421.6
Apr. 24, 2013 (WO) ................ PCT/GB2013/051039
Nov. 18, 2013 (GB) .................................. 1320342.7

(51) Int. Cl.
*B01D 53/54* (2006.01)
*B01D 53/56* (2006.01)
(Continued)

(52) U.S. Cl.
CPC ................ *F01N 3/035* (2013.01); *B01D 46/24* (2013.01); *B01D 53/34* (2013.01);
(Continued)

(58) Field of Classification Search
CPC ........ B01D 53/945; F01N 3/021; B01J 35/02;
B01J 35/023; B01J 35/04; B01J 35/10;
B01J 21/04; B01J 21/066; B01J 23/10;
B01J 23/40; B01J 23/42; B01J 23/44; B01J
23/464; B01J 23/56; B01J 23/63; B01J 23/70;
B01J 23/72; B01J 23/745; B01J 29/0333;
B01J 29/0356; B01J 29/044; B01J 29/072

USPC ................... 423/213.2, 213.5, 213.7; 60/299;
422/180; 502/64–66, 74, 302–304,
502/326–327, 332–334, 338–339, 340–341,
502/345, 349, 355, 439
See application file for complete search history.

(56) References Cited

U.S. PATENT DOCUMENTS 5,057,483 A 10/1991 Wan
5,473,887 A 12/1995 Takeshima et al.
(Continued)

FOREIGN PATENT DOCUMENTS

DE 102004040548 A1 2/2006
DE 102010055147 A1 6/2012
(Continued)

OTHER PUBLICATIONS

Abdul-Khalek et al.; Diesel Exhaust Particle Size: Measurement Issues and Trends; Society of Automotive Engineers, Inc.; 1998.
(Continued)

*Primary Examiner* — Cam N. Nguyen
(74) *Attorney, Agent, or Firm* — Gary D. Mangels

(57) ABSTRACT

A catalyzed filter for filtering particulate matter from exhaust gas emitted from a positive ignition internal combustion engine comprises a ceramic porous wall-flow filter substrate having a total substrate length and having inlet channels defined in part by ceramic inlet wall surfaces and outlet channels defined in part by ceramic outlet wall surfaces, wherein the inlet surfaces are separated from the outlet surfaces by a first porous structure containing pores of a first mean pore size, wherein the porous substrate is coated in part with a catalyst washcoat composition, wherein a second porous structure of a washcoated part of the porous substrate contains pores of a second mean pore size, wherein the second mean pore size is less than the first mean pore size, which catalyst washcoat composition being disposed in a first zone comprising the inlet surfaces of a first substrate length less than the total substrate length, wherein a second zone comprising the outlet surfaces of a second substrate length contains no washcoat and wherein the sum of the substrate length in the first zone and the substrate length in the second zone is >100%.

28 Claims, 4 Drawing Sheets

(51) Int. Cl.
| | |
|---|---|
| B01D 53/94 | (2006.01) |
| B01D 50/00 | (2006.01) |
| B01J 8/02 | (2006.01) |
| C01B 21/00 | (2006.01) |
| C01B 23/00 | (2006.01) |
| C01B 25/00 | (2006.01) |
| C01B 31/00 | (2006.01) |
| C01B 33/00 | (2006.01) |
| C01B 35/00 | (2006.01) |
| C01G 28/00 | (2006.01) |
| C01G 30/00 | (2006.01) |
| F01N 3/10 | (2006.01) |
| B01J 23/00 | (2006.01) |
| B01J 23/02 | (2006.01) |
| B01J 23/06 | (2006.01) |
| B01J 23/08 | (2006.01) |
| B01J 23/10 | (2006.01) |
| B01J 23/40 | (2006.01) |
| B01J 23/42 | (2006.01) |
| B01J 23/44 | (2006.01) |
| B01J 23/56 | (2006.01) |
| B01J 23/70 | (2006.01) |
| B01J 23/74 | (2006.01) |
| B01J 21/04 | (2006.01) |
| F01N 3/035 | (2006.01) |
| B01D 46/24 | (2006.01) |
| B01D 53/34 | (2006.01) |
| B01J 35/00 | (2006.01) |
| F01N 3/021 | (2006.01) |
| F01N 13/00 | (2010.01) |
| B01J 29/06 | (2006.01) |
| B01J 35/04 | (2006.01) |
| F01N 3/08 | (2006.01) |
| F01N 3/022 | (2006.01) |
| F01N 3/20 | (2006.01) |

(52) U.S. Cl.
CPC ....... *B01D 53/9431* (2013.01); *B01D 53/9472* (2013.01); *B01J 23/40* (2013.01); *B01J 29/06* (2013.01); *B01J 35/006* (2013.01); *B01J 35/04* (2013.01); *F01N 3/021* (2013.01); *F01N 13/009* (2014.06); *F01N 13/0097* (2014.06); B01D 53/944 (2013.01); B01D 53/9418 (2013.01); B01D 2255/1021 (2013.01); B01D 2255/1023 (2013.01); B01D 2255/1025 (2013.01); B01D 2255/50 (2013.01); B01D 2255/908 (2013.01); B01D 2255/9032 (2013.01); B01D 2255/91 (2013.01); B01D 2255/9155 (2013.01); B01D 2258/012 (2013.01); B01D 2258/014 (2013.01); F01N 3/0222 (2013.01); F01N 3/0814 (2013.01); F01N 3/0821 (2013.01); F01N 3/0842 (2013.01); F01N 3/101 (2013.01); F01N 3/2066 (2013.01); F01N 2330/06 (2013.01); F01N 2370/00 (2013.01); F01N 2510/0682 (2013.01); Y02T 10/22 (2013.01); Y02T 10/24 (2013.01)

(56) References Cited

U.S. PATENT DOCUMENTS

| | | | |
|---|---|---|---|
| 5,898,014 A | 4/1999 | Wu et al. | |
| 6,423,293 B1 | 7/2002 | Chun et al. | |
| 7,393,808 B2 | 7/2008 | Yoshida et al. | |
| 7,550,117 B2 | 6/2009 | Alward et al. | |
| 7,572,416 B2 | 8/2009 | Alward et al. | |
| 7,772,151 B2 * | 8/2010 | Li et al. | 502/339 |
| 7,785,544 B2 | 8/2010 | Alward et al. | |
| 8,012,439 B2 * | 9/2011 | Arnold et al. | 423/212 |
| 8,211,393 B2 * | 7/2012 | Arnold et al. | 423/213.2 |
| 8,404,203 B2 * | 3/2013 | Bull et al. | 423/213.5 |
| 8,475,752 B2 | 7/2013 | Wan | |
| 8,512,657 B2 * | 8/2013 | Arnold et al. | 423/213.2 |
| 8,540,952 B2 * | 9/2013 | Swallow et al. | 423/213.2 |
| 8,608,820 B2 * | 12/2013 | Arnold et al. | 55/523 |
| 8,637,426 B2 * | 1/2014 | Hoke et al. | 502/339 |
| 8,640,440 B2 | 2/2014 | Klingmann et al. | |
| 8,652,429 B2 | 2/2014 | Sumiya et al. | |
| 8,667,785 B2 * | 3/2014 | Blakeman et al. | 60/299 |
| 8,668,891 B2 | 3/2014 | Blakeman et al. | |
| 8,735,311 B2 * | 5/2014 | Bull et al. | 502/60 |
| 8,789,356 B2 * | 7/2014 | Phillips et al. | 60/274 |
| 8,795,617 B2 * | 8/2014 | Swallow et al. | 423/213.2 |
| 8,815,189 B2 * | 8/2014 | Arnold et al. | 423/213.2 |
| 8,919,110 B2 * | 12/2014 | Arnold et al. | 60/299 |
| 2003/0126133 A1 | 7/2003 | Dattatri et al. | |
| 2004/0191133 A1 | 9/2004 | Yamaguchi | |
| 2006/0039843 A1 | 2/2006 | Patchett et al. | |
| 2006/0057046 A1 | 3/2006 | Punke et al. | |
| 2007/0012028 A1 | 1/2007 | Weissman et al. | |
| 2007/0104623 A1 | 5/2007 | Dettling et al. | |
| 2008/0045405 A1 | 2/2008 | Beutel et al. | |
| 2008/0053070 A1 | 3/2008 | Hatton | |
| 2008/0124514 A1 | 5/2008 | Fujdala et al. | |
| 2009/0087365 A1 | 4/2009 | Klingmann et al. | |
| 2009/0129995 A1 | 5/2009 | Pfeifer et al. | |
| 2009/0193796 A1 * | 8/2009 | Wei et al. | 60/297 |
| 2009/0274602 A1 * | 11/2009 | Alward et al. | 423/239.1 |
| 2009/0288402 A1 * | 11/2009 | Voss et al. | 60/299 |
| 2010/0058746 A1 | 3/2010 | Pfeifer et al. | |
| 2010/0077727 A1 | 4/2010 | Southward et al. | |
| 2010/0077738 A1 | 4/2010 | Cavataio et al. | |
| 2010/0092358 A1 | 4/2010 | Koegel et al. | |
| 2010/0126133 A1 | 5/2010 | Fekety et al. | |
| 2010/0275579 A1 | 11/2010 | Klingmann et al. | |
| 2011/0158871 A1 | 6/2011 | Arnold et al. | |
| 2011/0176969 A1 | 7/2011 | Michiaki et al. | |
| 2011/0179777 A1 | 7/2011 | Chandler et al. | |
| 2011/0185709 A1 | 8/2011 | Zhang et al. | |
| 2011/0201493 A1 | 8/2011 | Goto et al. | |
| 2011/0252773 A1 | 10/2011 | Arnold et al. | |
| 2011/0271664 A1 * | 11/2011 | Boorse et al. | 60/301 |
| 2012/0129690 A1 | 5/2012 | Larcher et al. | |
| 2012/0304623 A1 | 12/2012 | Springer et al. | |
| 2013/0149207 A1 * | 6/2013 | Castagnola et al. | 422/177 |
| 2013/0149223 A1 * | 6/2013 | Blakeman et al. | 423/213.5 |
| 2013/0243659 A1 | 9/2013 | Sutton et al. | |
| 2014/0044626 A1 * | 2/2014 | Greenwell | 423/212 |
| 2014/0154163 A1 | 6/2014 | Andersen et al. | 423/237 |
| 2014/0186226 A1 | 7/2014 | Arnold et al. | 422/180 |
| 2014/0186244 A1 | 7/2014 | Blakeman et al. | 423/213.5 |
| 2014/0219879 A1 * | 8/2014 | Bull et al. | 422/170 |
| 2014/0227155 A1 * | 8/2014 | Phillips et al. | 423/212 |
| 2014/0234189 A1 * | 8/2014 | Clowes et al. | 423/213.5 |
| 2014/0271422 A1 * | 9/2014 | Tang | 423/212 |
| 2014/0271426 A1 * | 9/2014 | Casci et al. | 423/213.2 |
| 2014/0271429 A1 * | 9/2014 | Kazi et al. | 423/213.5 |
| 2014/0301923 A1 * | 10/2014 | Tang et al. | 423/212 |
| 2014/0301924 A1 | 10/2014 | Morgan | |
| 2014/0322112 A1 | 10/2014 | Blakeman et al. | |

FOREIGN PATENT DOCUMENTS

| | | |
|---|---|---|
| DE | 102011050788 A1 | 12/2012 |
| EP | 0766993 A3 | 5/1997 |
| EP | 1108864 A3 | 6/2001 |
| EP | 1136115 A1 | 9/2001 |
| EP | 1663458 B1 | 1/2009 |
| EP | 2042225 A1 | 4/2009 |
| EP | 2042226 A2 | 4/2009 |
| EP | 2184459 A1 | 5/2010 |
| EP | 1057519 B2 | 8/2011 |
| EP | 2650042 A1 | 10/2013 |
| FR | 2928176 A1 | 9/2009 |
| GB | 2406803 A | 4/2005 |
| GB | 2468210 B | 9/2010 |

(56) References Cited

FOREIGN PATENT DOCUMENTS

| | | | |
|---|---|---|---|
| GB | 2476585 A | 6/2011 | |
| GB | 2497441 A | 6/2013 | |
| GB | 2497442 A | 6/2013 | |
| JP | 2005264866 A | 9/2005 | |
| WO | 99 47260 A1 | 9/1999 | |
| WO | 0116050 A1 | 3/2001 | |
| WO | 0180978 A1 | 11/2001 | |
| WO | 2006031600 A1 | 3/2006 | |
| WO | 2007011498 A1 | 1/2007 | |
| WO | 2008022967 A1 | 2/2008 | |
| WO | 2008132452 A2 | 11/2008 | |
| WO | 2009043390 A2 | 4/2009 | |
| WO | 2009079590 A1 | 6/2009 | |
| WO | 2009089156 A1 | 7/2009 | |
| WO | 2009100097 A2 | 8/2009 | |
| WO | 2010004320 A2 | 1/2010 | |
| WO | 2010097634 A1 | 9/2010 | |
| WO | 2011015615 A1 | 2/2011 | |
| WO | 2011077139 A1 | 6/2011 | |
| WO | 2011080525 A1 | 7/2011 | |
| WO | 2011110919 A1 | 9/2011 | |
| WO | 2012069405 A1 | 5/2012 | |
| WO | 2014174277 A1 | 10/2014 | |

OTHER PUBLICATIONS

Howitt et al.; Cellular Ceramic Diesel Particulate Filter; Society of Automotive Engineers, Inc.; 1981.

Hall et al.; Measurement of the Number and Size Distribution of Particles Emitted from a Gasoline Direct Injection Vehicle; Society of Automotive Engineers, Inc.; 1999.

Wei et al.; Single-Stage Dilution Tunnel Performance; Society of Automotive Engineers, Inc., 2001.

* cited by examiner

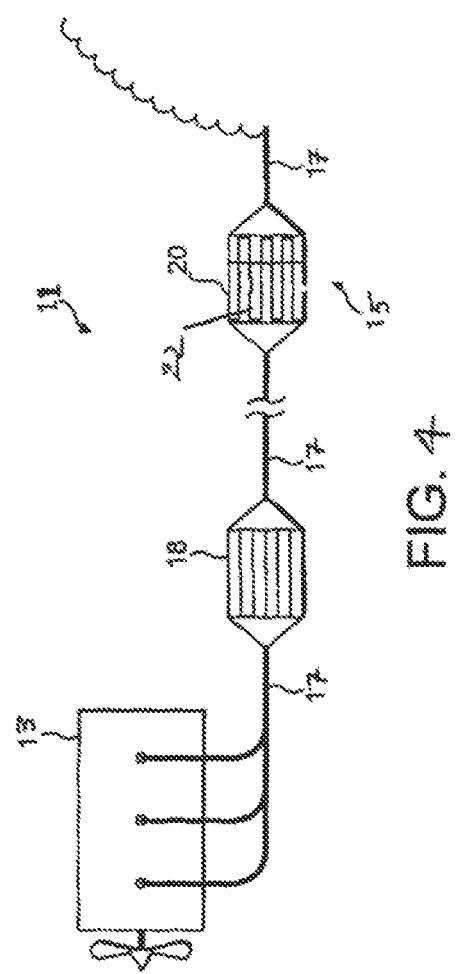

FILTER SUBSTRATE COMPRISING ZONE-COATED CATALYST WASHCOAT

CROSS REFERENCE TO RELATED APPLICATIONS

This application claims priority benefit to U.S. Provisional Patent Application No. 61/815,443 filed on Apr. 24, 2013, to Great Britain Patent Application No. 1307421.6 filed on Apr. 24, 2013, to PCT Application No. PCT/GB2013/051039 filed on Apr. 24, 2013, and to Great Britain Patent Application No. 1320342.7 filed on Nov. 18, 2013, each of which are incorporated herein by reference.

FIELD OF THE INVENTION

The present invention relates to a catalysed filter inter alia for filtering particulate matter from exhaust gas emitted from a positive ignition internal combustion engine.

BACKGROUND TO THE INVENTION

Positive ignition engines cause combustion of a hydrocarbon and air mixture using spark ignition. Contrastingly, compression ignition engines cause combustion of a hydrocarbon by injecting the hydrocarbon into compressed air. Positive ignition engines can be fuelled by gasoline fuel, gasoline fuel blended with oxygenates including methanol and/or ethanol, liquid petroleum gas or compressed natural gas. Positive ignition engines can be stoichiometrically operated engines or lean-burn operated engines.

Ambient PM is divided by most authors into the following categories based on their aerodynamic diameter (the aerodynamic diameter is defined as the diameter of a 1 $g/cm^3$ density sphere of the same settling velocity in air as the measured particle):
  (i) PM-10—particles of an aerodynamic diameter of less than 10 μm;
  (ii) Fine particles of diameters below 2.5 μm (PM-2.5);
  (iii) Ultrafine particles of diameters below 0.1 μm (or 100 nm); and
  (iv) Nanoparticles, characterised by diameters of less than 50 nm.

Since the mid-1990's, particle size distributions of particulates exhausted from internal combustion engines have received increasing attention due to possible adverse health effects of fine and ultrafine particles. Concentrations of PM-10 particulates in ambient air are regulated by law in the USA. A new, additional ambient air quality standard for PM-2.5 was introduced in the USA in 1997 as a result of health studies that indicated a strong correlation between human mortality and the concentration of fine particles below 2.5 μm.

Interest has now shifted towards nanoparticles generated by diesel and gasoline engines because they are understood to penetrate more deeply into human lungs than particulates of greater size and consequently they are believed to be more harmful than larger particles, extrapolated from the findings of studies into particulates in the 2.5-10.0 μm range.

Size distributions of diesel particulates have a well-established bimodal character that correspond to the particle nucleation and agglomeration mechanisms, with the corresponding particle types referred to as the nuclei mode and the accumulation mode respectively (see FIG. 1). As can be seen from FIG. 1, in the nuclei mode, diesel PM is composed of numerous small particles holding very little mass. Nearly all diesel particulates have sizes of significantly less than 1 μm, i.e. they comprise a mixture of fine, i.e. falling under the 1997 US law, ultrafine and nanoparticles.

Nuclei mode particles are believed to be composed mostly of volatile condensates (hydrocarbons, sulfuric acid, nitric acid etc.) and contain little solid material, such as ash and carbon. Accumulation mode particles are understood to comprise solids (carbon, metallic ash etc.) intermixed with condensates and adsorbed material (heavy hydrocarbons, sulfur species, nitrogen oxide derivatives etc.) Coarse mode particles are not believed to be generated in the diesel combustion process and may be formed through mechanisms such as deposition and subsequent re-entrainment of particulate material from the walls of an engine cylinder, exhaust system, or the particulate sampling system. The relationship between these modes is shown in FIG. 1.

The composition of nucleating particles may change with engine operating conditions, environmental condition (particularly temperature and humidity), dilution and sampling system conditions. Laboratory work and theory have shown that most of the nuclei mode formation and growth occur in the low dilution ratio range. In this range, gas to particle conversion of volatile particle precursors, like heavy hydrocarbons and sulfuric acid, leads to simultaneous nucleation and growth of the nuclei mode and adsorption onto existing particles in the accumulation mode. Laboratory tests (see e.g. SAE 980525 and SAE 2001-01-0201) have shown that nuclei mode formation increases strongly with decreasing air dilution temperature but there is conflicting evidence on whether humidity has an influence.

Generally, low temperature, low dilution ratios, high humidity and long residence times favour nanoparticles formation and growth. Studies have shown that nanoparticles consist mainly of volatile material like heavy hydrocarbons and sulfuric acid with evidence of solid fraction only at very high loads.

Contrastingly, engine-out size distributions of gasoline particulates in steady state operation show a unimodal distribution with a peak of about 60-80 nm (see e.g. FIG. 4 in SAE 1999-01-3530). By comparison with diesel size distribution, gasoline PM is predominantly ultrafine with negligible accumulation and coarse mode.

Particulate collection of diesel particulates in a diesel particulate filter is based on the principle of separating gas-borne particulates from the gas phase using a porous barrier. Diesel filters can be defined as deep-bed filters and/or surface-type filters. In deep-bed filters, the mean pore size of filter media is bigger than the mean diameter of collected particles. The particles are deposited on the media through a combination of depth filtration mechanisms, including diffusional deposition (Brownian motion), inertial deposition (impaction) and flow-line interception (Brownian motion or inertia).

In surface-type filters, the pore diameter of the filter media is less than the diameter of the PM, so PM is separated by sieving. Separation is done by a build-up of collected diesel PM itself, which build-up is commonly referred to as "filtration cake" and the process as "cake filtration".

It is understood that diesel particulate filters, such as ceramic wallflow monoliths, may work through a combination of depth and surface filtration: a filtration cake develops at higher soot loads when the depth filtration capacity is saturated and a particulate layer starts covering the filtration surface. Depth filtration is characterized by somewhat lower filtration efficiency and lower pressure drop than the cake filtration.

Other techniques suggested in the art for separating gasoline PM from the gas phase include vortex recovery.

Emission legislation in Europe from 1 Sep. 2014 (Euro 6) requires control of the number of particles emitted from both diesel and gasoline (positive ignition) passenger cars. For gasoline EU light duty vehicles the allowable limits are: 1000 mg/km carbon monoxide; 60 mg/km nitrogen oxides ($NO_x$); 100 mg/km total hydrocarbons (of which ≤68 mg/km are non-methane hydrocarbons); and 4.5 mg/km particulate matter ((PM) for direct injection engines only). The Euro 6 PM standard will be phased in over a number of years with the standard from the beginning of 2014 being set at $6.0 \times 10^{12}$ per km (Euro 6) and the standard set from the beginning of 2017 being $6.0 \times 10^{12}$ per km (Euro 6+). In a practical sense, the range of particulates that are legislated for are between 23 nm and 3 µm.

In the United States, on 22 Mar. 2012, the State of California Air Resources Board (CARB) adopted new Exhaust Standards from 2017 and subsequent model year "LEV III" passenger cars, light-duty trucks and medium-duty vehicles which include a 3 mg/mile emission limit, with a later introduction of 1 mg/mi possible, as long as various interim reviews deem it feasible.

The new Euro 6 (Euro 6 and Euro 6+) emission standard presents a number of challenging design problems for meeting gasoline emission standards. In particular, how to design a filter, or an exhaust system including a filter, for reducing the number of PM gasoline (positive ignition) emissions, yet at the same time meeting the emission standards for non-PM pollutants such as one or more of oxides of nitrogen ($NO_x$), carbon monoxide (CO) and unburned hydrocarbons (HC), all at an acceptable back pressure, e.g. as measured by maximum on-cycle backpressure on the EU drive cycle.

TWCs are intended to catalyse three simultaneous reactions: (i) oxidation of carbon monoxide to carbon dioxide, (ii) oxidation of unburned hydrocarbons to carbon dioxide and water; and (iii) reduction of nitrogen oxides to nitrogen and oxygen. These three reactions occur most efficiently when the TWC receives exhaust gas from an engine running at or about the stoichiometric point. As is well known in the art, the quantity of carbon monoxide (CO), unburned hydrocarbons (HC) and nitrogen oxides ($NO_x$) emitted when gasoline fuel is combusted in a positive ignition (e.g. spark-ignited) internal combustion engine is influenced predominantly by the air-to-fuel ratio in the combustion cylinder. An exhaust gas having a stoichiometrically balanced composition is one in which the concentrations of oxidising gases ($NO_x$ and $O_2$) and reducing gases (HC and CO) are substantially matched. The air-to-fuel ratio that produces this stoichiometrically balanced exhaust gas composition is typically given as 14.7:1.

A three-way catalyst (TWC) typically contains one or more platinum group metals, particularly those selected from the group consisting of platinum, palladium and rhodium.

Theoretically, it should be possible to achieve complete conversion of $O_2$, $NO_x$, CO and HC in a stoichiometrically balanced exhaust gas composition to $CO_2$, $H_2O$ and $N_2$ (and residual $O_2$) and this is the duty of the TWC. Ideally, therefore, the engine should be operated in such a way that the air-to-fuel ratio of the combustion mixture produces the stoichiometrically balanced exhaust gas composition.

A way of defining the compositional balance between oxidising gases and reducing gases of the exhaust gas is the lambda ($\lambda$) value of the exhaust gas, which can be defined according to equation (1) as:

$$\text{Actual engine air-to-fuel ratio/Stoichiometric engine air-to-fuel ratio,} \quad (1)$$

wherein a lambda value of 1 represents a stoichiometrically balanced (or stoichiometric) exhaust gas composition, wherein a lambda value of >1 represents an excess of $O_2$ and $NO_x$ and the composition is described as "lean" and wherein a lambda value of <1 represents an excess of HC and CO and the composition is described as "rich". It is also common in the art to refer to the air-to-fuel ratio at which the engine operates as "stoichiometric", "lean" or "rich", depending on the exhaust gas composition which the air-to-fuel ratio generates: hence stoichiometrically-operated gasoline engine or lean-burn gasoline engine.

It should be appreciated that the reduction of $NO_x$ to $N_2$ using a TWC is less efficient when the exhaust gas composition is lean of stoichiometric. Equally, the TWC is less able to oxidise CO and HC when the exhaust gas composition is rich. The challenge, therefore, is to maintain the composition of the exhaust gas flowing into the TWC at as close to the stoichiometric composition as possible.

Of course, when the engine is in steady state it is relatively easy to ensure that the air-to-fuel ratio is stoichiometric. However, when the engine is used to propel a vehicle, the quantity of fuel required changes transiently depending upon the load demand placed on the engine by the driver. This makes controlling the air-to-fuel ratio so that a stoichiometric exhaust gas is generated for three-way conversion particularly difficult. In practice, the air-to-fuel ratio is controlled by an engine control unit, which receives information about the exhaust gas composition from an exhaust gas oxygen (EGO) (or lambda) sensor: a so-called closed loop feedback system. A feature of such a system is that the air-to-fuel ratio oscillates (or perturbates) between slightly rich of the stoichiometric (or control set) point and slightly lean, because there is a time lag associated with adjusting air-to-fuel ratio. This perturbation is characterised by the amplitude of the air-to-fuel ratio and the response frequency (Hz).

When the exhaust gas composition is slightly rich of the set point, there is a need for a small amount of oxygen to consume the unreacted CO and HC, i.e. to make the reaction more stoichiometric. Conversely, when the exhaust gas goes slightly lean, the excess oxygen needs to be consumed. This was achieved by the development of the oxygen storage component that liberates or absorbs oxygen during the perturbations. The most commonly used oxygen storage component (OSC) in modern TWCs is cerium oxide ($CeO_2$) or a mixed oxide containing cerium, e.g. a Ce/Zr mixed oxide.

The active components in a typical TWC comprise one or both of platinum and palladium in combination with rhodium, or even palladium only (no rhodium), supported on a high surface area oxide, and an oxygen storage component.

It is envisaged that a minimum of particle reduction for a three-way catalysed particulate filter to meet the Euro 6 PM number standard relative to an equivalent flowthrough catalyst is ≥50%. Additionally, while some backpressure increase for a three-way catalysed wallflow filter relative to an equivalent flowthrough catalyst is inevitable, in our experience peak backpressure over the MVEG-B drive cycle (average over three tests from "fresh") for a majority of passenger vehicles should be limited to <200 mbar, such as <180 mbar, <150 mbar and preferably <120 mbar e.g. <100 mbar.

There have been a number of recent efforts to combine TWCs with filters for meeting the Euro 6 emission standards, including US 2009/0193796 discloses an emission treatment system downstream of a gasoline direct injection engine for treatment of an exhaust gas comprising hydrocarbons, carbon monoxide, nitrogen oxides and particulates, the emission treatment system optionally comprising a particulate trap zone-coated with an oxidation catalyst comprising platinum group metal consisting of platinum and palladium.

The new emission standards will force the use of filters for filtering particulate matter from exhaust gas emitted from positive ignition internal combustion engines. However, because the size of such particulate matter is much finer than particulate matter emitted from diesel engines, the design challenge is to filter particulate matter from positive ignition exhaust gas but at acceptable back pressure.

We have now discovered a way of catalysing a filter for use in the exhaust system of a vehicular positive ignition engine, thereby reducing the total volume of exhaust system components compared with separate filter and catalyst substrate components—which is important particularly on passenger vehicles where space can be restricted—but which has lower back pressure relative to a homogeneously coated catalysed filter, i.e. having coatings applied via inlet and outlet ends both at the same washcoat loading.

SUMMARY OF THE INVENTION

The invention is a catalysed filter for filtering particulate matter from exhaust gas emitted from a positive ignition internal combustion engine. The filter comprises a ceramic porous wall-flow filter substrate having a total substrate length and having inlet channels defined in part by ceramic inlet wall surfaces and outlet channels defined in part by ceramic outlet wall surfaces. The inlet surfaces are separated from the outlet surfaces by a first porous structure containing pores of a first mean pore size. The porous substrate is coated in part with a catalyst washcoat composition. A second porous structure of a washcoated part of the porous substrate contains pores of a second mean pore size, wherein the second mean pore size is less than the first mean pore size. The catalyst washcoat composition is disposed in a first zone comprising the inlet surfaces of a first substrate length less than the total substrate length. A second zone comprising the outlet surfaces of a second substrate length contains no washcoat and the sum of the substrate length in the first zone and the substrate length in the second zone is >100%. The invention also includes an exhaust system comprising the catalysed filter, a positive ignition engine comprising the exhaust system, a vehicle comprising the engine, and a method for simultaneously converting oxides of nitrogen and particulate matter in the exhaust gas of a positive ignition internal combustion engine comprising the step of contacting the gas with the catalysed filter.

BRIEF DESCRIPTION OF THE DRAWINGS

FIG. 4 is a schematic drawing of an embodiment of an exhaust system according to the invention.

DETAILED DESCRIPTION OF THE INVENTION

According to one aspect, the invention provides a catalysed filter for filtering particulate matter from exhaust gas emitted from a positive ignition internal combustion engine, which filter comprising a ceramic porous wall-flow filter substrate having a total substrate length and having inlet channels defined in part by ceramic inlet wall surfaces and outlet channels defined in part by ceramic outlet wall surfaces, wherein the inlet surfaces are separated from the outlet surfaces by a first porous structure containing pores of a first mean pore size, wherein the porous substrate is coated in part with a catalyst washcoat composition, wherein a second porous structure of a washcoated part of the porous substrate contains pores of a second mean pore size, wherein the second mean pore size is less than the first mean pore size, which catalyst washcoat composition being disposed in a first zone comprising the inlet surfaces of a first substrate length less than the total substrate length, wherein a second zone comprising the outlet surfaces of a second substrate length contains no washcoat and wherein the sum of the substrate length in the first zone and the substrate length in the second zone is >100%.

According to the first aspect of the invention, the second zone having a second substrate length comprises the outlet surfaces containing no washcoat. As the second zone contains no washcoat, it follows that the length of "unwashcoated" second zone will always be substantially the same as the total substrate length (taking into account any end plugs present at one end of the outlet channels of the wall-flow filter). Since the inlet surfaces comprise a first zone having a first substrate length less than the total substrate length, the sum of the substrate length in the first zone and the substrate length in the second zone will be >100%.

Figure 2A:
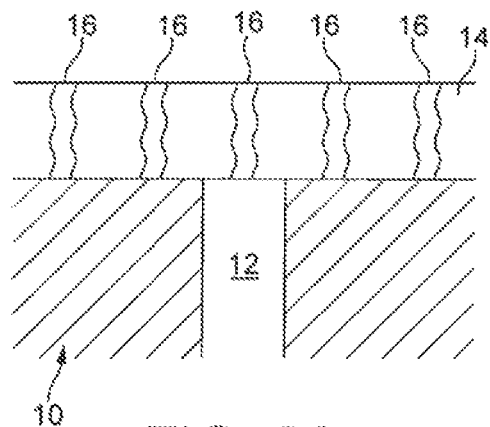
FIGS. 2A-C show schematic drawings of three embodiments of washcoated porous filter substrates according to the invention.
Figure 2B:
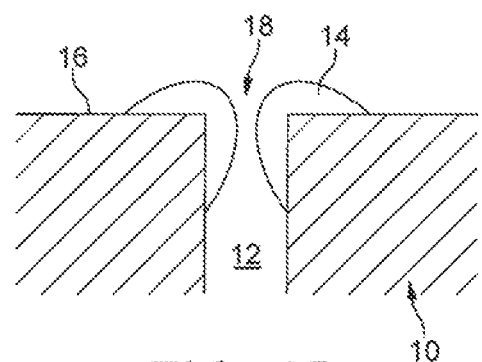
Figure 2C:
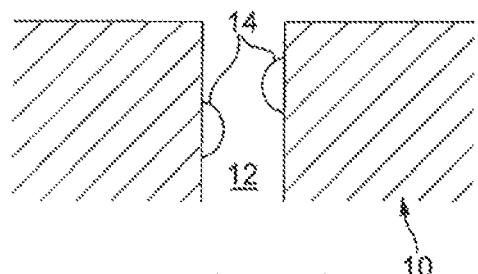

It will be understood that, in embodiments, the second porous structure is comprised of the first porous structure, e.g. in embodiments shown in FIGS. 2B and 2C, wherein at least part of the washcoat particles is in the porous structure.

Mean pore size can be determined by mercury porosimetry.

In embodiments the catalyst washcoat composition is a three-way catalyst washcoat composition, an oxidation catalyst washcoat composition, a $NO_x$ absorber catalyst washcoat composition or a selective catalytic reduction (SCR) catalyst washcoat composition, but is preferably a three-way catalyst washcoat composition. Preferably, however, the catalyst washcoat composition is the three-way catalyst washcoat composition.

A TWC washcoat composition for use in the first aspect of the present invention comprises one or both of platinum and palladium in combination with rhodium, or in embodiments palladium only (no platinum or rhodium) or rhodium only (no platinum or palladium) supported on a high surface area oxide, e.g. gamma alumina, and an oxygen storage component, e.g. comprising a mixed oxide comprising cerium.

The oxidation catalyst washcoat composition may contain base metal catalytic agents, platinum group metal catalytic agents or combinations of both that are supported on refractory metal oxides, e.g., activated alumina. Base metal catalytic agents may include rare earth metal oxides, particularly lanthanum oxide, cerium oxide and praseodymium oxide. Specific platinum group metal catalytic agents may include platinum, palladium, rhodium and combinations thereof. Useful refractory metal oxides may include silica, alumina, gamma-alumina, titania, zirconia, silica-alumina and ceria-zirconia. Optionally, the catalytic washcoat composition also may contain other additives such as promoters and stabilizers. Molecular sieves such as zeolites may also be useful in the oxidation catalyst.

$NO_x$ absorber catalysts (NACs) are known e.g. from U.S. Pat. No. 5,473,887 and are designed to adsorb nitrogen oxides ($NO_x$) from lean exhaust gas (lambda >1) and to desorb the $NO_x$ when the oxygen concentration in the exhaust gas is decreased. Desorbed $NO_x$ may be reduced to $N_2$ with a suitable reductant, e.g. gasoline fuel, promoted by a catalyst component, such as rhodium, of the NAC itself or located downstream of the NAC. In practice, control of oxygen concentration can be adjusted to a desired redox composition intermittently in response to a calculated remaining $NO_x$ adsorption capacity of the NAC, e.g. richer than normal engine running operation (but still lean of stoichiometric or lambda=1 composition), stoichiometric or rich of stoichiometric (lambda <1). The oxygen concentration can be adjusted by a number of means, e.g. throttling, injection of additional hydrocarbon fuel into an engine cylinder such as during the exhaust stroke or injecting hydrocarbon fuel directly into exhaust gas downstream of an engine manifold.

A typical NAC formulation includes a catalytic oxidation component, such as platinum, a significant quantity, i.e. substantially more than is required for use as a promoter such as a promoter in a TWC, of a $NO_x$-storage component, such as barium or ceria ($CeO_2$), and a reduction catalyst, e.g. rhodium. One mechanism commonly given for $NO_x$-storage from a lean exhaust gas for this formulation is:

$$NO + \tfrac{1}{2}O_2 \rightarrow NO_2 \quad (2); \text{ and}$$

$$BaO + NO_2 + \tfrac{1}{2}O_2 \rightarrow Ba(NO_3)_2 \quad (3),$$

wherein in reaction (2), the nitric oxide reacts with oxygen on active oxidation sites on the platinum to form $NO_2$. Reaction (3) involves adsorption of the $NO_2$ by the storage material in the form of an inorganic nitrate.

At lower oxygen concentrations and/or at elevated temperatures, the nitrate species become thermodynamically unstable and decompose, producing NO or $NO_2$ according to reaction (4) below. In the presence of a suitable reductant, these nitrogen oxides are subsequently reduced by carbon monoxide, hydrogen and hydrocarbons to $N_2$, which can take place over the reduction catalyst (see reaction (5)).

$$Ba(NO_3)_2 \rightarrow BaO + 2NO + \tfrac{3}{2}O_2 \text{ or } Ba(NO_3)_2 \rightarrow BaO + 2NO_2 + \tfrac{1}{2}O_2 \quad (4); \text{ and}$$

$$NO + CO \rightarrow \tfrac{1}{2}N_2 + CO_2 \quad (5);$$

(Other reactions include $Ba(NO_3)_2 + 8H_2 \rightarrow BaO + 2NH_3 + 5H_2O$ followed by $NH_3 + NO_x \rightarrow N_2 + yH_2O$ or $2NH_3 + 2O_2 + CO \rightarrow N_2 + 3H_2O + CO_2$ etc.).

In the reactions of (2)-(5) above, the reactive barium species is given as the oxide. However, it is understood that in the presence of air most of the barium is in the form of the carbonate or possibly the hydroxide. The skilled person can adapt the above reaction schemes accordingly for species of barium other than the oxide and sequence of catalytic coatings in the exhaust stream and any other alkaline earth metals, alkali metals or lanthanides included for $NO_x$ absorption.

Modern $NO_x$ absorber catalysts coated on honeycomb flowthrough monolith substrates are typically arranged in layered arrangements. However, multiple layers applied on a filter substrate can create backpressure problems. It is highly preferable, therefore, if the $NO_x$ absorber catalyst for use in the present invention is a "single layer" $NO_x$ absorber catalyst. Particularly preferred "single layer" $NO_x$ absorber catalysts comprise a first component of rhodium supported on a ceria-zirconia mixed oxide or an optionally stabilised alumina (e.g. stabilised with silica or lanthana or another rare earth element) in combination with second components which support platinum and/or palladium. The second components comprise platinum and/or palladium supported on an alumina-based high surface area support and a particulate "bulk" ceria ($CeO_2$) component or mixed oxide comprising ceria, i.e. not a soluble ceria supported on a particulate support, but "bulk" ceria capable of supporting the Pt and/or Pd as such. The particulate ceria (or mixed oxide comprising ceria) comprises a $NO_x$ absorber component and supports an alkaline earth metal and/or an alkali metal, preferably barium, in addition to the platinum and/or palladium. The alumina-based high surface area support can be magnesium aluminate e.g. $MgAl_2O_4$, for example.

The preferred "single layer" NAC composition comprises a mixture of the rhodium and platinum and/or palladium support components. These components can be prepared separately, i.e. pre-formed prior to combining them in a mixture, or rhodium, platinum and palladium salts and the supports and other components can be combined and the rhodium, platinum and palladium components hydrolysed preferentially to deposit onto the desired support.

SCR catalysts for use in the present invention promote the reactions selectively $4NH_3 + 4NO + O_2 \rightarrow 4N_2 + 6H_2O$ (i.e. 1:1 $NH_3$:NO); $4NH_3 + 2NO + 2NO_2 \rightarrow 4N_2 + 6H_2O$ (i.e. 1:1 $NH_3$:$NO_x$; and $8NH_3 + 6NO_2 \rightarrow 7N_2 + 12H_2O$ (i.e. 4:3 $NH_3$:$NO_x$) in preference to undesirable, non-selective side-reactions such as $2NH_3 + 2NO_2 \rightarrow N_2O + 3H_2O + N_2$ and can be selected from the group consisting of at least one of Cu, Hf, La, Au, In, V, lanthanides and Group VIII transition metals, such as Fe, supported on a refractory oxide or molecular sieve. Particularly preferred metals are Ce, Fe and Cu and combinations of any two or more thereof. Suitable refractory oxides include $Al_2O_3$, $TiO_2$, $CeO_2$, $SiO_2$, $ZrO_2$ and mixed oxides containing two or more thereof. The non-zeolite catalyst can also include tungsten oxide, e.g. $V_2O_5/WO_3/TiO_2$, $WO_x/CeZrO_2$, $WO_x/ZrO_2$ or $Fe/WO_x/ZrO_2$.

In particularly preferred embodiments, an SCR catalyst washcoat comprises at least one molecular sieve, such as an aluminosilicate zeolite or a SAPO. The at least one molecular sieve can be a small, a medium or a large pore molecular sieve, for example. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts—see for example WO 2008/132452.

Preferred molecular sieves with application as SCR catalysts in the present invention are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

It is a particular feature of the present invention that the first zone intended for orientation in an exhaust system to an upstream side can be higher than the previously regarded highest washcoat loadings, e.g. those disclosed in the Examples in WO 2010/097634, whereas the second zone contains no washcoat. In the accompanying Example, the resulting three-way catalysed filter has a lower backpressure than a homogeneously zone-coated filter at the same platinum group metal loading. In a particular embodiment, the washcoat loading in the first zone is >1.60 g in$^{-3}$ such as >2.00 g in$^{-3}$ or for example 1.6 to 2.4 g in$^{-3}$, and in preferred embodiments the washcoat loading in the first zone is >2.4 g in$^{-3}$. Preferably, however, the washcoat loading in the first zone is ≤3.0 g/in$^{-3}$.

In the invention, because the outlet surfaces contain no washcoat, the second substrate length is always 100%. In embodiments, the first zone length (i.e. first substrate length less than the total substrate length) can be 25-75% of the total substrate length. e.g. 50%. However, in a preferred embodiment, the substrate length in the first zone <50% of the total substrate length. The preferred embodiment is desirable in the embodiment comprising the $NO_x$ absorber catalyst washcoat composition, the embodiment comprising the oxidation catalyst washcoat composition or the preferred embodiment comprising the three-way catalyst washcoat composition when used in an exhaust system wherein the exhaust system comprises a flow through monolith substrate comprising a three-way catalyst composition upstream of the catalysed filter. This is because the filter has a lower backpressure, but the system as a whole contains sufficient platinum group metal to meet emissions standards e.g. for reduction in CO, HC and $NO_x$.

In embodiments, the substrate length in the first zone is <45% such as <40%, e.g. <35% of the total substrate length.

However, in embodiments wherein the catalyst washcoat composition is a SCR catalyst washcoat composition, longer first zone lengths may be preferred, e.g. >50%, to achieve a desired overall level of $NO_x$ conversion in the system. For the avoidance of doubt, however, it will be understood that the limitations in the preceding paragraph, i.e. "In embodiments, the substrate length in the first zone is <45% etc." can apply equally to the filters according to the first aspect of the invention comprising a SCR catalyst washcoat composition.

In embodiments comprising precious metals, specifically platinum group metals, such as in embodiments wherein the catalyst washcoat composition is a three-way catalyst, a $NO_x$ absorber catalyst or an oxidation catalyst, the total precious metal loading in the first zone can be >50 gft$^{-3}$, but is preferably between 60-250 gft$^{-3}$, and is typically from 70-150 gft$^{-3}$.

In preferred embodiments, the first zone comprises a surface washcoat, wherein a washcoat layer substantially covers surface pores of the porous structure and the pores of the washcoated porous substrate are defined in part by spaces between the particles (interparticle pores) in the washcoat. In this preferred embodiment, a mean interparticle pore size of the porous washcoat is 5.0 nm to 5.0 µm, such as 0.1-1.0 µm. Methods of making surface coated porous filter substrates include introducing a polymer, e.g. poly vinyl alcohol (PVA), into the porous structure, applying a washcoat to the porous filter substrate including the polymer and drying, then calcining the coated substrate to burn out the polymer. A schematic representation of the first embodiment is shown in FIG. 2A.

A D90 of solid washcoat particles in this first, surface coating embodiment can be in the range 0.1 to 20 µm, or 10 to 40 µm, such as 15 to 30 µm or 12 to 25 µm or >15 µm such as from 18 to 40 µm, e.g. 20 to 35 µm or 25 to 30 µm. "D90" as used herein defines the particle size distribution in a washcoat wherein 90% of the particles present have a diameter within the range specified. In embodiments, the corresponding mean particle size (D50) of the solid washcoat particles is in the range 1 to 40 µm e.g., 1 to 20 µm, such as between 4 and 15 µm, such as 5 to 12 µm or 7 to 10 µm. In certain embodiments, the D50 particle size is 5 µm and the corresponding D90 is about 15 µm. In another embodiment, where the D50 particle size is 7-10 µm, e.g. 7-8 µm, the D90 particle size is about 20 µm. It will be understood that the broader the range of particle sizes in the washcoat, the more likely that washcoat may enter the porous structure of the porous substrate.

In TWC embodiments, the oxygen storage components may have a different particle size from the high surface area oxide. So, an OSC may have a D50 between 1-10 µm, such as from 4 to 6 µm; and a high surface area oxide may have a D50 of between 1-10 µm, such as from 4 to 6 µm.

In further TWC embodiments, the D90 of solid washcoat particles is in the range of from 0.1 to 20 µm. Again, the D90 of the OSC may be different from that of the high surface area oxide. So, the D90 of the OSC can be <18 µm and the D90 of the high surface area oxide can be <20 µm.

D50 and D90 measurements disclosed herein were obtained by Laser Diffraction Particle Size Analysis using a Malvern Mastersizer 2000, which is a volume-based technique (i.e. D50 and D90 may also be referred to as $D_V^{50}$ and $D_V 90$ (or D(v,0.50) and D(v,0.90)) and applies a mathematical Mie theory model to determine a particle size distribution. Diluted washcoat samples were prepared by sonication in distilled water without surfactant for 30 seconds at 35 watts.

Methods of coating porous filter substrates are known to the skilled person and include, without limitation, the method disclosed in WO 99/47260, i.e. a method of coating a monolithic support, comprising the steps of (a) locating a containment means on top of a support, (b) dosing a pre-determined quantity of a liquid component into said containment means, either in the order (a) then (b) or (b) then (a), and (c) by applying pressure or vacuum, drawing said liquid component into at least a portion of the support, and retaining substantially all of said quantity within the support. Such process steps can be repeated from another end of the monolithic support following drying of the first coating with optional firing/calcination.

Alternatively, the method disclosed in WO 2011/080525 can be used, i.e. comprising the steps of: (i) holding a honeycomb monolith substrate substantially vertically: (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate.

According to a second embodiment, the washcoat can be coated on inlet surfaces and also within the porous structure of the porous substrate. We believe that a surface coating around a pore opening at the inlet and/or outlet surfaces, thereby narrowing the e.g. surface pore size of a bare filter substrate, promotes interaction of the gas phase including PM without substantially restricting the pore volume, so not giving rise to significant increases in back pressure. That is, the pores at a surface of the porous structure comprise a pore opening and the washcoat causes a narrowing of substantially all the pore openings. A schematic representation of the second embodiment is shown in FIG. 2B.

Methods of making a filter according to the second embodiment can involve appropriate formulation of the washcoat known to the person skilled in the art including adjusting viscosity and surface wetting characteristics and application of an appropriate vacuum following coating of the porous substrate (see also WO 99/47260).

In the first and second embodiments, the inlet surfaces can include a plurality of washcoat layers, e.g. a $NO_x$ absorber catalyst or TWC composition, wherein each washcoat layer within the plurality of layers can be the same or different, e.g. the mean pore size in a first layer can be different from that of a second layer.

According to a third embodiment, the washcoat sits substantially within, i.e. permeates, the porous structure of the porous substrate. A schematic representation of this third embodiment is shown in FIG. 2C. Methods of making a filter according to the third embodiment include the appropriate formulation of the washcoat known to the person skilled in the art including viscosity adjustment, selection of low wetting characteristics and application of an appropriate vacuum following washcoating of the porous substrate (see also WO 99/47260). Alternatively, the porous substrate can be soaked in an appropriate solution of salts and the resulting product dried and calcined.

EP 1663458 discloses a SCR filter, wherein the filter is a wallflow monolith and wherein an SCR catalyst composition permeates walls of the wallflow monolith. The specification discloses generally that the walls of the wallflow filter can contain thereon or therein (i.e. not both) one or more catalytic materials. According to the disclosure, "permeate", when used to describe the dispersion of a catalyst slurry on the wallflow monolith substrate, means the catalyst composition is dispersed throughout the wall of the substrate.

In the second and third embodiments, wherein at least part of the washcoat is in the porous structure, a size, e.g. a mean size, of the solid washcoat particles can be less than the mean pore size of the porous filter substrate for example in the range 0.1 to 20 µm, such as 1 to 18 µm, 1 to 16 µm, 2 to 15 µm or 3 to 12 µm. In particular embodiments, the abovementioned size of the solid washcoat particles is a D90 instead of a mean size. In preferred embodiments, the at least one in-wall inlet coating composition has a mean particle size (D50) of 1 to 3 µm. In such embodiments, the at least one in-wall inlet coating composition can have a D90 particle size of 4 to 6 µm.

According to the invention, the filter is a wallflow filter comprising a ceramic porous filter substrate having a plurality of inlet channels and a plurality of outlet channels, wherein each inlet channel and each outlet channel is defined in part by a ceramic wall of porous structure, wherein each inlet channel is separated from an outlet channel by a ceramic wall of porous structure. This filter arrangement is also disclosed in SAE 810114, and reference can be made to this document for further details.

The cell density of diesel wallflow filters in practical use can be different from wallflow filters for use in the present invention in that the cell density of diesel wallflow filters is generally 300 cells per square inch (cpsi) or less, e.g. 100 or 200 cpsi, so that the relatively larger diesel PM components can enter inlet channels of the filter without becoming impacted on the solid frontal area of the diesel particulate filter, thereby caking and fouling access to the open channels, whereas wallflow filters for use in the present invention can be up to 300 cpsi or greater, such as 350 cpsi, 400 cpsi, 600 cpsi, 900 cpsi or even 1200 cpsi.

An advantage of using higher cell densities is that the filter can have a reduced cross-section, e.g. diameter, than diesel particulate filters, which is a useful practical advantage that increases design options for locating exhaust systems on a vehicle.

It will be understood that the benefit of filters for use in the invention is substantially independent of the porosity of the uncoated porous substrate. Porosity is a measure of the percentage of void space in a porous substrate and is related to backpressure in an exhaust system: generally, the lower the porosity, the higher the backpressure. However, the porosity of filters for use in the present invention are typically >40% or >50% and porosities of 45-75% such as 50-65% or 55-60% can be used with advantage. The mean pore size of the washcoated porous substrate is important for filtration. So, it is possible to have a porous substrate of relatively high porosity that is a poor filter because the mean pore size is also relatively high.

In embodiments, the first mean pore size e.g. of surface pores of the porous structure of the porous filter substrate is from 8 to 45 µm, for example preferably 8 to 25 µm, 10 to 20 µm or 10 to 15 µm. In preferred embodiments, the first mean pore size is >18 µm such as from 15 to 45 µm, 20 to 45 µm e.g. 20 to 30 µm, or 25 to 45 µm.

According to a second aspect, the invention provides an exhaust system for a positive ignition internal combustion engine comprising a catalysed filter according to the first aspect of the invention, wherein the first zone is disposed upstream of the second zone.

In a particularly preferred embodiment of the second aspect according to the invention, the exhaust system comprises a flow through monolith substrate comprising a three-way catalyst composition or a $NO_x$ absorber catalyst composition disposed upstream of the catalysed filter. This is a particularly preferred arrangement for embodiments of the first aspect of the invention wherein the catalyst washcoat composition is a three-way catalyst washcoat composition, because the filter of the first aspect according to the invention produces less back-pressure in the system but $NO_x$ conversion in the system overall is maintained because the three way catalyst volume is made up of the upstream flow through monolith substrate coating and the coating in the first zone of the filter according to the first aspect of the invention.

Exhaust systems comprising SCR catalyst require nitrogenous reductant to promote the $NO_x$ reduction reaction, i.e. to be effective, nitrogenous reductant should be present in exhaust gas flowing into the SCR catalyst. Suitable nitrogenous reductants include ammonia. Ammonia can be generated by heating ammonium carbamate (a solid) and the ammonia generated can be injected into the exhaust gas. Alternatively, ammonia can be generated in situ e.g. during rich regeneration of a NAC disposed upstream of the filter or by contacting a TWC with engine-derived rich exhaust gas (see the alternatives to reactions (4) and (5) hereinabove).

Alternatively or additionally to in situ ammonia generation, the nitrogenous reductant or a precursor thereof can be injected directly into the exhaust gas. Suitable precursors include ammonium formate and urea. Decomposition of the precursor to ammonia and other by-products can be by hydrothermal or catalytic hydrolysis. Accordingly, in embodiments, the exhaust system according to the second aspect of the invention can comprise an injector means for injecting a nitrogenous reductant into flowing exhaust gas upstream of the catalysed filter. Such injector is fluidly linked to a source of such nitrogenous reductant precursor, e.g. a tank thereof, and valve-controlled dosing of the precursor into the exhaust stream is regulated by suitably programmed engine management means and closed loop or open loop feedback provided by sensors monitoring relevant exhaust gas composition.

In a further preferred embodiment, the filter is catalysed with a $NO_x$ absorber catalyst washcoat and a honeycomb substrate monolith comprising a SCR catalyst (preferably any of the preferred SCR catalysts disclosed hereinabove) is disposed downstream of the filter. Intermittent rich running of the engine. e.g. to regenerate the $NO_x$ absorption capacity of the $NO_x$ absorber catalyst, can generate ammonia in situ on the TWC or $NO_x$ absorber for use in reducing $NO_x$ on a downstream SCR catalyst.

Therefore, the exhaust system of the positive ignition engine according to the second aspect of the invention can comprise a series of monolith substrates disposed in a flow direction from upstream to downstream according to one of the following arrangements:

(i) TWC on a flow through monolith substrate followed by a filter substrate comprising a TWC according to the first aspect of the present invention;

(ii) TWC on a flow through monolith substrate followed by a filter substrate comprising a SCR catalyst according to the first aspect of the invention, wherein the engine is configured intermittently to run rich, thereby to generate ammonia in situ on the TWC component;

(iii) NO$_x$ absorber catalyst on a flow through monolith substrate followed by a filter substrate comprising a SCR catalyst according to the first aspect of the invention, wherein the engine is configured intermittently to run rich, thereby to generate ammonia in situ on the NO$_x$ absorber catalyst component;

(iv) NO$_x$ absorber catalyst on a filter substrate according to the first aspect of the invention followed by a flow through honeycomb substrate comprising a SCR catalyst, wherein the engine is configured intermittently to run rich, thereby to generate ammonia in situ on the NO$_x$ absorber catalyst component;

(v) as (ii) except in that the TWC is on a filter substrate according to the invention and a flow through substrate monolith comprises the SCR catalyst;

(vi) as (iii) except in that a TWC on a flow through monolith substrate is disposed upstream of the NO$_x$ absorber catalyst on a flow through monolith substrate, wherein ammonia may be generated on both the TWC component and the NO$_x$ absorber catalyst component;

(vii) as (iv) except in that a TWC on a flow through monolith substrate is disposed upstream of the NO$_x$ absorber catalyst on the filter according to the first aspect of the invention, wherein ammonia may be generated in situ on both the TWC component and the NO$_x$ absorber catalyst component; and (viii) as any of (ii)-(vii) inclusive, wherein instead of or in addition to an in situ ammonia generation system, an injector means for injecting a nitrogenous reductant or a precursor thereof is disposed upstream of the SCR catalyst but downstream of the TWC or NO$_x$ absorber catalyst.

According to a third aspect, the invention provides a positive ignition engine comprising an exhaust system according to the second aspect of the present invention.

In a preferred embodiment according to the third aspect of the invention, the catalyst washcoat composition is a selective catalytic reduction (SCR) catalyst washcoat composition and the system comprises engine management means for controlling at least one engine cylinder thereby to emit enriched exhaust gas from the engine for generating ammonia in situ on the flow through monolith substrate comprising a three-way catalyst composition or a NO$_x$ absorber catalyst composition disposed upstream of the catalysed filter.

Positive ignition internal combustion engines, such as spark ignition internal combustion engines, for use in this aspect of the invention can be fuelled by gasoline fuel, gasoline fuel blended with oxygenates including methanol and/or ethanol, liquid petroleum gas or compressed natural gas. Positive ignition engines can be stoichiometrically operated engines or lean-burn operated engines.

According to a fourth aspect, the invention provides a vehicle comprising a positive ignition engine according to the fourth aspect of the invention.

According to a fifth aspect, the invention provides a method of simultaneously converting oxides of nitrogen and particulate matter in the exhaust gas of a positive ignition internal combustion engine, which method comprising the step of contacting the gas with a catalysed filter comprising a porous substrate having a total substrate length and having inlet surfaces and outlet surfaces, wherein the inlet surfaces are separated from the outlet surfaces by a first porous structure containing pores of a first mean pore size, wherein the porous substrate is coated in part with a catalyst washcoat composition, wherein a second porous structure of a washcoated part of the porous substrate contains pores of a second mean pore size, wherein the second mean pore size is less than the first mean pore size, which catalyst washcoat composition being disposed in a first zone comprising the inlet surfaces of a first substrate length less than the total substrate length, wherein a second zone comprising the outlet surfaces of a second substrate length contains no washcoat and wherein the sum of the substrate length in the first zone and the substrate length in the second zone is >100%.

Figure 1:
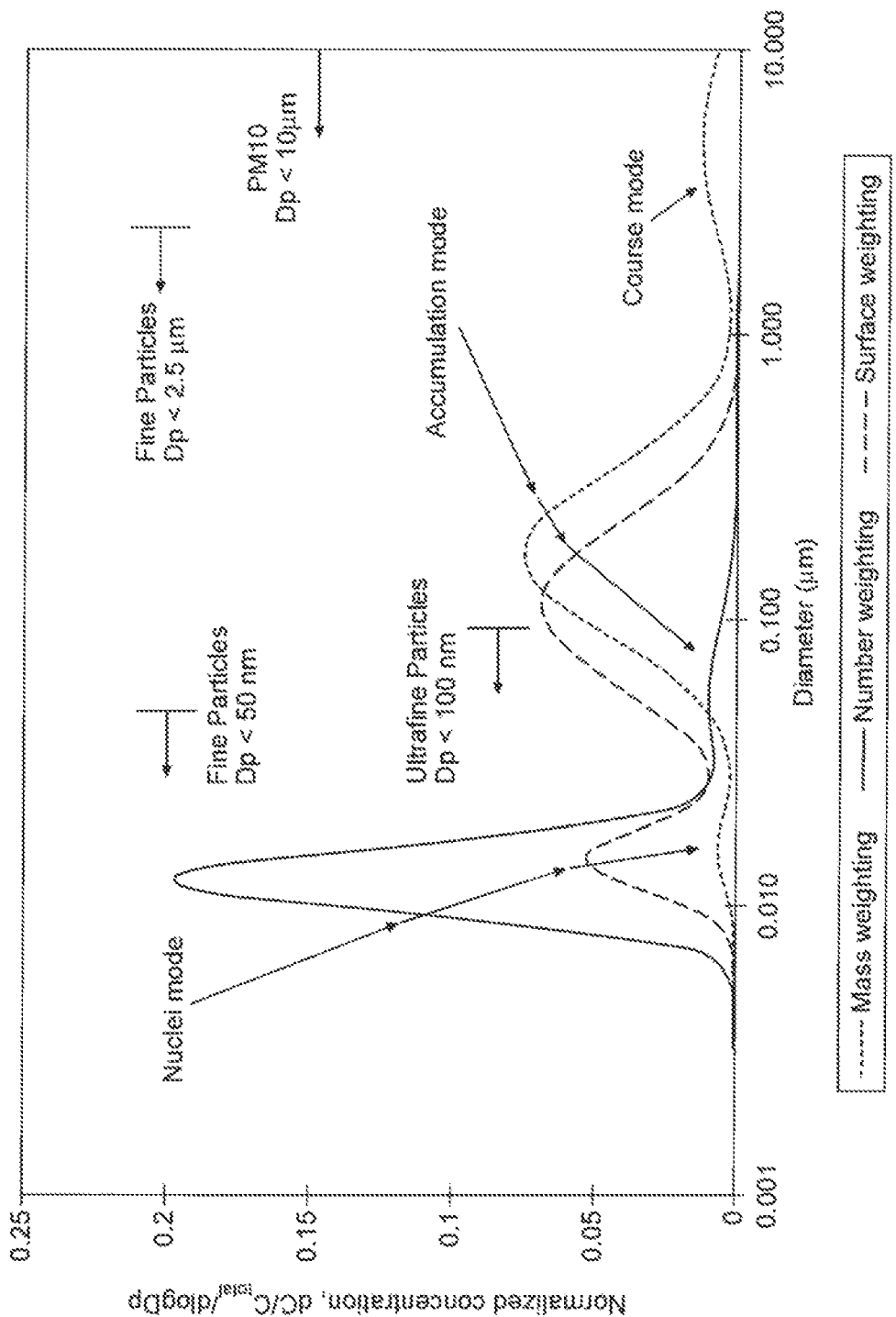
FIG. 1 is a graph showing the size distributions of PM in the exhaust gas of a diesel engine.
Figure 3:
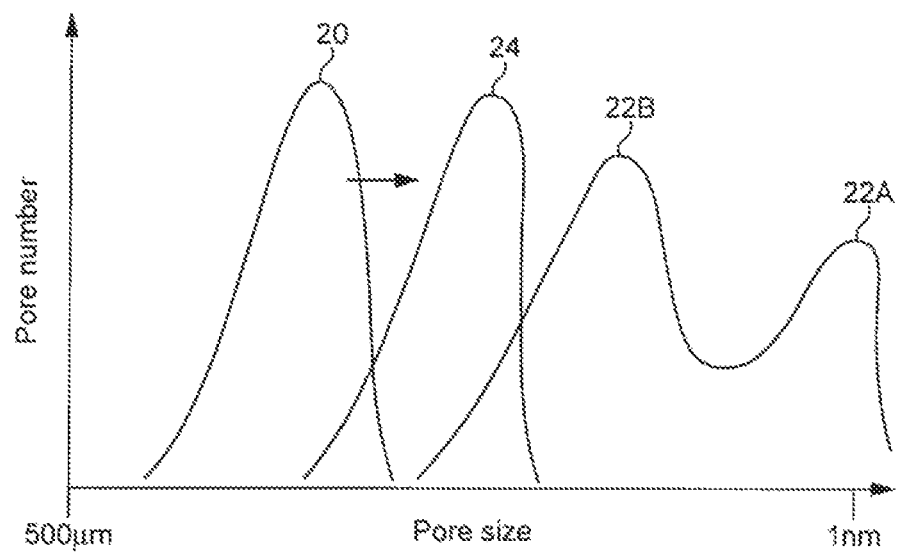
FIG. 3 is a schematic graph of mercury porosimetry relating the pore size distribution of a porous filter substrate, a porous washcoat layer and a porous filter substrate including a porous surface washcoat layer.

In order that the invention may be more fully understood, reference is made to the accompanying drawings wherein:

FIG. 1 is a graph showing the size distributions of PM in the exhaust gas of a diesel engine. For comparison, a gasoline size distribution is shown at FIG. 4 of SAE 1999-01-3530;

FIGS. 2A-C show schematic drawings of three embodiments of washcoated porous filter substrates according to the invention;

FIG. 3 is a schematic graph of mercury porosimetry relating the pore size distribution of a porous filter substrate, a porous washcoat layer and a porous filter substrate including a porous surface washcoat layer; and FIG. 4 is a schematic drawing of an embodiment of an exhaust system according to the invention.

FIGS. 2A-C show a cross-section through a porous filter substrate 10 comprising a surface pore 12. FIG. 2 shows a cross-section through a porous filter substrate 10 comprising a surface pore 12. FIG. 2 shows an embodiment, featuring a porous surface washcoat layer 14 comprised of solid washcoat particles, the spaces between which particles define pores (interparticle pores). It can be seen that the washcoat layer 14 substantially covers the pore 12 of the porous structure and that a mean pore size of the interparticle pores 16 is less than the mean pore size 12 of the porous filter substrate 10.

FIG. 2B shows a second embodiment comprising a washcoat that is coated on an inlet surface 16 and additionally within a porous structure 12 of the porous substrate 10. It can be seen that the washcoat layer 14 causes a narrowing of a pore openings of surface pore 12, such that a mean pore size 18 of the coated porous substrate is less than the mean pore size 12 of the porous filter substrate 10.

FIG. 2C shows a third embodiment wherein the washcoat 14 sits substantially within, i.e. permeates, the porous 12 structure of the porous substrate 10.

FIG. 3 shows an illustration of a graph relating pore size to pore number for a porous filter substrate 20, a porous washcoat layer 22 and a porous diesel filter substrate including a surface washcoat layer 24. It can be seen that the filter substrate has a mean pore size of the order of about 15 µm. The washcoat layer has a bimodal distribution comprised of intraparticle pores 22A (at the nanometer end of the range) and interparticle pores 22B towards the micrometer end of the scale. It can also be seen that by coating the porous filter substrate with a washcoat according to the invention that the pore distribution of the bare filter substrate is shifted in the direction of the interparticle washcoat pore size (see arrow).

FIG. 4 shows an apparatus 11 according to the invention comprising a vehicular positive ignition engine 13 and an exhaust system 15 therefor. Exhaust system 15 comprises a conduit 17 linking catalytic aftertreatment components, namely a Pd—Rh-based TWC coated onto an inert cordierite flowthrough substrate 18 disposed close to the exhaust manifold of the engine (the so-called close coupled position). Downstream of the close-coupled catalyst 18 in turn is a zoned CuCHA SCR catalyst coated onto a cordierite wall-flow filter 20 having a total length and comprising inlet channels coated to a length of two thirds of the total length measured from an upstream or inlet end of the wall-flow filter with a washcoat loading of 2.8 gin$^{-3}$, which coating defining a first zone 22. The outlet channels are free of any coating. Engine management means (not shown) is run intermittently rich, i.e.

in "rich spike"-type mode, thereby to contact the upstream TWC with enriched exhaust gas and to generate ammonia and other reformed nitrogenous reductant species in situ and to promote $NO_x$ conversion on the downstream SCR catalyst.

The following Example is provided by way of illustration only. The washcoat loadings quoted in the Example was obtained using the method disclosed in WO 2011/080525.

Example

Two cordierite wall-flow filters of dimensions 4.66×5.5 inches, 300 cells per square inch, wall thickness 12 thousandths of an inch and having a mean pore size of 20 μm and a porosity of 65% were each coated with a TWC composition in a different configuration from the other. A first, reference filter, was zone coated homogeneously to a length of 50% of total filter length from the inlet end and to a length of 50% of total filter length from the outlet end with the same three-way catalyst washcoat at 40 g/ft$^3$ total platinum group metals and to a total of 1.6 g/in$^3$ washcoat loading. A second filter, according to the invention, was zone coated with an identical three-way catalyst washcoat to that which was used in the reference Example to a length of 50% of total length of the filter from the inlet end. The outlet end zone was left bare of any washcoat. A total platinum group metal loading in the first, inlet zone was 80 g/ft$^{-3}$ at a washcoat loading of 2.4 g/in$^{-3}$. i.e. the platinum group metal loading was identical between the reference Example and the filter according to the present invention.

The coated filters were each hydrothermally oven aged in 10% water/air for 5 hours at 950° C. Cold flow back pressure of each part was measured at room temperature using a Super-Flow® backpressure laboratory test apparatus drawing air at room temperature and pressure. The results are set out in the following Table, from which it can be seen that the results that for the range of flow rates tested, the back pressure generated by the reference Example is significantly higher than for the filter according to the invention for the same precious metal loading.

TABLE 1

Presenting cold flow back pressure (mBar)
vs. Flow (m$^3$/h) data comparing filter
according to the Invention with Reference Example

| Flow (m$^3$/h) | Backpressure (mBar) | | % mBar Difference between Example & Reference |
|---|---|---|---|
| | Inlet Zone Coated Filter | Reference Filter | |
| 200 | 11.7 | 15.3 | −23.5 |
| 300 | 20.7 | 25.2 | −17.9 |
| 400 | 31.7 | 36.5 | −13.2 |
| 500 | 44.8 | 49.3 | −9.1 |
| 600 | 60.0 | 63.6 | −5.7 |

For the avoidance of any doubt, the entire contents of all prior art documents cited herein is incorporated herein by reference.

The invention claimed is:

1. A catalysed filter for filtering particulate matter from exhaust gas emitted from a positive ignition internal combustion engine, which filter comprising a ceramic porous wall-flow filter substrate having a total substrate length and having inlet channels defined in part by ceramic inlet wall surfaces and outlet channels defined in part by ceramic outlet wall surfaces, wherein the inlet surfaces are separated from the outlet surfaces by a first porous structure containing pores of a first mean pore size, wherein the porous substrate is coated in part with a catalyst washcoat composition, wherein a second porous structure of a washcoated part of the porous substrate contains pores of a second mean pore size, wherein the second mean pore size is less than the first mean pore size, which catalyst washcoat composition being disposed in a first zone comprising the inlet surfaces of a first substrate length less than the total substrate length, wherein a second zone comprising the outlet surfaces of a second substrate length contains no washcoat and wherein the sum of the substrate length in the first zone and the substrate length in the second zone is >100%.

2. A filter according to claim 1, wherein the catalyst washcoat composition is selected from the group consisting of a three-way catalyst washcoat composition, an oxidation catalyst washcoat composition, a $NO_x$ absorber catalyst washcoat composition and a selective catalytic reduction (SCR) catalyst washcoat composition.

3. A filter according to claim 2, wherein the NO absorber catalyst washcoat composition comprises: a mixture of rhodium supported on a zirconia-based mixed oxide, a ceria-zirconia mixed oxide or an optionally stabilised alumina; and platinum and/or palladium supported on an alumina-based high surface area support and ceria or a mixed oxide comprising ceria and an alkaline earth metal, an alkali metal or a lanthanide is supported on the ceria or mixed oxide comprising ceria.

4. A filter according to claim 2, wherein the SCR catalyst washcoat composition comprises Cu, Fe and/or Ce supported on or exchanged into a synthetic aluminosilicate zeolite molecular sieve selected from the group consisting of AEI, MFI (ZSM-5), ERI, mordenite, ferrierite, BEA, Y, CHA and LEV.

5. A filter according to claim 2, wherein the catalyst washcoat composition is a three-way catalyst washcoat composition, an oxidation catalyst washcoat composition or a NO absorber catalyst washcoat composition, wherein a total platinum group metal loading in the first zone is >50 gft$^{-3}$.

6. A filter according to claim 1, wherein the catalyst washcoat composition is a three-way catalyst washcoat composition.

7. A filter according to claim 6, wherein the three-way catalyst washcoat composition comprises at least one platinum group metal supported on a high surface area oxide, and an oxygen storage component.

8. A filter according to claim 7, wherein the at least one platinum group metal is selected from the group consisting of (i) platinum and rhodium; (ii) palladium and rhodium; (iii) platinum, palladium and rhodium; (iv) palladium only; and (v) rhodium only.

9. A filter according to claim 1, wherein the washcoat loading in the first zone is greater than 1.60 gin$^{-3}$.

10. A filter according to claim 1, wherein the substrate zone length in the first zone is 25 to 75% of the total substrate length.

11. A filter according to claim 10, wherein the substrate zone length in the first zone is <45% of the total substrate length.

12. A filter according to claim 1, comprising a surface catalyst washcoat composition comprising solid washcoat particles, wherein a catalyst washcoat composition layer substantially covers surface pores of the porous structure and the pores of the second mean pore size of the washcoated porous substrate are defined in part by spaces between the particles (interparticle pores) in the catalyst washcoat composition.

13. A filter according to claim 12, wherein a D90 size of the solid washcoat particles is in the range 10 to 40 μm.

14. A filter according to claim 12, wherein a mean particle size (D50) of solid washcoat particles is in the range 1 to 20 μm.

15. A filter according to claim 1, wherein the washcoat comprises solid washcoat particles, wherein the pores at a surface of the porous structure comprise a pore opening and the washcoat causes a narrowing of substantially all the surface pore openings.

16. A filter according to claim 15, wherein a mean size (D50) of solid washcoat particles is less than a mean pore size of the porous substrate.

17. A filter according to claim 15, wherein a D90 size of solid washcoat particles is in the range 4 to 6 μm.

18. A filter according to claim 15, wherein a mean size (D50) of solid washcoat particles is in the range 1 to 3 μm.

19. A filter according to claim 1, wherein the uncoated porous substrate has a porosity of >40%.

20. A filter according to claim 1, wherein a first mean pore size of the porous structure of the porous substrate is from 8 to 45 μm.

21. A filter according to claim 1, wherein the washcoat comprises solid washcoat particles, wherein the washcoat locates substantially within the porous structure of the porous substrate.

22. An exhaust system for a positive ignition internal combustion engine comprising a catalysed filter according to claim 1, wherein the first zone is disposed upstream of the second zone.

23. An exhaust system according to claim 22, wherein the exhaust system comprises a flow through monolith substrate comprising a three-way catalyst composition or a $NO_x$ absorber catalyst composition disposed upstream of the catalysed filter.

24. An exhaust system according to claim 22, wherein the catalyst washcoat composition is a selective catalytic reduction (SCR) catalyst washcoat composition, which system comprising an injector means for injecting a nitrogenous reductant into flowing exhaust gas upstream of the catalysed filter.

25. A positive ignition engine comprising an exhaust system according to claim 22.

26. A positive ignition engine comprising an exhaust system according to claim 25, wherein the catalyst washcoat composition is a selective catalytic reduction (SCR) catalyst washcoat composition, which system comprising engine management means for controlling at least one engine cylinder to emit enriched exhaust gas for generating ammonia in situ on the flow through monolith substrate comprising a three-way catalyst composition or a $NO_x$ absorber catalyst composition disposed upstream of the catalysed filter.

27. A vehicle comprising a positive ignition engine according to claim 25.

28. A method of simultaneously converting oxides of nitrogen and particulate matter in the exhaust gas of a positive ignition internal combustion engine, which method comprising the step of contacting the gas with a catalysed filter comprising a porous substrate having a total substrate length and having inlet surfaces and outlet surfaces, wherein the inlet surfaces are separated from the outlet surfaces by a first porous structure containing pores of a first mean pore size, wherein the porous substrate is coated in part with a catalyst washcoat composition, wherein a second porous structure of a washcoated part of the porous substrate contains pores of a second mean pore size, wherein the second mean pore size is less than the first mean pore size, which catalyst washcoat composition being disposed in a first zone comprising the inlet surfaces of a first substrate length less than the total substrate length, wherein a second zone comprising the outlet surfaces of a second substrate length contains no washcoat and wherein the sum of the substrate length in the first zone and the substrate length in the second zone is >100%.

* * * * *